(12) United States Patent
McKay

(10) Patent No.: US 6,779,789 B1
(45) Date of Patent: Aug. 24, 2004

(54) METHOD FOR IDENTIFYING ADVERTISING FORMS FOR INSERTION INTO PUBLICATIONS

(75) Inventor: Lynda McKay, Shelton, CT (US)

(73) Assignee: Media Networks, Inc., Stamford, CT (US)

( * ) Notice: Subject to any disclaimer, the term of this patent is extended or adjusted under 35 U.S.C. 154(b) by 0 days.

(21) Appl. No.: 10/403,664

(22) Filed: Mar. 31, 2003

(51) Int. Cl.[7] .............................................. B42B 2/00
(52) U.S. Cl. .................. 270/52.26; 101/483; 270/1.02; 283/36; 283/67; 281/42; 705/14
(58) Field of Search ................................ 101/483, 485, 101/486, 482; 270/1.01, 1.02, 4, 5.02, 52.17, 52.18, 52.02, 52.26, 58.23, 58.31, 58.32, 1.03, 50.31; 283/36, 42, 67; 281/31, 42; 705/14

(56) References Cited

U.S. PATENT DOCUMENTS

| 3,917,252 A | | 11/1975 | Harder et al. ................. 270/58 |
|---|---|---|---|
| 4,034,210 A | * | 7/1977 | Hill et al. .................... 235/487 |
| RE31,710 E | * | 10/1984 | Jackson ..................... 270/1.02 |
| 4,482,142 A | * | 11/1984 | McCain et al. .......... 270/52.26 |
| 4,797,832 A | * | 1/1989 | Axelrod et al. ............ 270/1.03 |
| 5,029,830 A | | 7/1991 | Quadracci ..................... 270/52 |
| 5,114,128 A | | 5/1992 | Harris, Jr. et al. ............ 270/11 |
| 5,143,362 A | | 9/1992 | Doane et al. ................ 270/1.1 |
| 5,346,196 A | | 9/1994 | Nussbaum et al. ........... 270/54 |
| 5,413,321 A | | 5/1995 | Banks et al. ................. 270/58 |
| 5,419,541 A | | 5/1995 | Stevens ....................... 270/57 |
| 5,716,075 A | * | 2/1998 | Evert .......................... 281/31 |
| 5,835,923 A | * | 11/1998 | Shibata et al. .............. 707/526 |
| 5,911,442 A | * | 6/1999 | Olson .......................... 283/36 |
| 6,240,334 B1 | | 5/2001 | Duke et al. ................. 700/221 |
| 6,631,397 B1 | * | 10/2003 | Satomi ....................... 709/203 |
| 2002/0046089 A1 | | 4/2002 | Zorn ........................... 705/14 |
| 2002/0087594 A1 | | 7/2002 | Peters ........................ 707/511 |
| 2002/0161625 A1 | | 10/2002 | Brito-Valladares et al. ... 705/10 |

* cited by examiner

Primary Examiner—Eugene H. Eickholt
(74) Attorney, Agent, or Firm—Winston & Strawn LLP

(57) ABSTRACT

The present invention relates to a technique for accurately identifying advertising forms for insertion into different publications. In an implementation, the method includes providing the advertising forms with a lap area, and printing a lap identifier onto the lap area. The lap identifier includes at least one of a publication name and an issue code so that the advertising forms can be properly correlated with the publication.

16 Claims, 5 Drawing Sheets

| NTW | | MAGAZINE | BIND | JOG | MAGAZINE TRIM | OFF-PRESS SIG SIZE | DELIVERED TO BINDERY | ROLL SIZE(4-8/6/2) | BINDERY |
|---|---|---|---|---|---|---|---|---|---|
| 1 | F | PARENTS | PERFECT | FOOT | 7 7/8 x 10 1/2 | 8 1/4 x 11 3/8 | 8 1/8 x 10 3/4 | 33-24 11/16-16.5 | DYERSBURG (QW) |
| 2 | F | PARENTING | PERFECT | FOOT | 7 7/8 x 10 1/2 | 8 1/4 x 11 3/8 | 8 1/8 x 10 3/4 | 33-24 11/16-16.5 | SUSSEX (Q) |
| 3 | F | FAMILY FUN | PERFECT | FOOT | 7 7/8 x 10 1/2 | 8 1/4 x 11 3/8 | 8 1/8 x 10 3/4 | 33-24 11/16-16.5 | DYERSBURG (QW) |
| 4 | E | MONEY | PERFECT | FOOT | 8 x 10 1/2 | 8 1/4 x 11 3/8 | 8 1/8 x 10 3/4 | 33-24 11/16-16.5 | CLARKSVILLE (QW) |
| 5 | E | FSB | PERFECT | FOOT | 8 x 10 1/2 | 8 1/4 x 11 3/8 | 8 1/8 x 10 3/4 | 33-24 11/16-16.5 | SARATOGA (Q) |
| 6 | E | FORBES | PERFECT | FOOT | 8 x 10 1/2 | 8 1/4 x 11 3/8 | 8 1/8 x 10 3/4 | 33-24 11/16-16.5 | DYERSBURG (Q) |
| 7 | H | COUNTRY HOME | PERFECT | FOOT | 8 x 10 1/2 | 8 1/4 x 11 3/8 | 8 1/8 x 10 3/4 | 33-24 11/16-16.5 | HARTFORD (Q) |
| 8 | L | TRAVEL + LEISURE | PERFECT | FOOT | 8 x 10 1/2 | 8 1/4 x 11 3/8 | 8 1/8 x 10 3/4 | 33-24 11/16-16.5 | SARATOGA (Q) |
| 9 | L | FOOD & WINE | PERFECT | FOOT | 8 x 10 1/2 | 8 1/4 x 11 3/8 | 8 1/8 x 10 3/4 | 33-24 11/16-16.5 | SARATOGA (Q) |
| 10 | M | GOLF | PERFECT | FOOT | 8 x 10 1/2 | 8 1/4 x 11 3/8 | 8 1/8 x 10 3/4 | 33-24 11/16-16.5 | SUSSEX (Q) |
| 11 | M | TL GOLF | PERFECT | FOOT | 8 x 10 3/4 | 8 1/4 x 11 3/8 | 8 1/8 x 10 3/4 | 33-24 11/16-16.5 | STRASBURG (P) |
| 12 | H | BON APPETIT | PERFECT | FOOT | 8 x 10 7/8 | 8 1/4 x 11 3/8 | 8 1/8 x 11 1/8 | 33-24 11/16-16.5 | DANVILLE (D) |
| 13 | E | FORTUNE | PERFECT | FOOT | 8 x 10 7/8 | 8 1/4 x 11 3/8 | 8 1/8 x 11 1/8 | 33-24 11/16-16.5 | CLARKSVILLE (QW) |
| 14 | L | VANITY FAIR | PERFECT | FOOT | 8 x 10 7/8 | 8 1/4 x 11 3/8 | 8 1/8 x 11 1/8 | 33-24 11/16-16.5 | DANVILLE (D) |
| 15 | E | ESQUIRE | PERFECT | FOOT | 8 x 10 7/8 | 8 1/4 x 11 3/8 | 8 1/8 x 11 1/8 | 33-24 11/16-16.5 | GLASGOW (D) |
| 16 | M | GQ | PERFECT | FOOT | 8 x 10 7/8 | 8 1/4 x 11 3/8 | 8 1/8 x 11 1/8 | 33-24 11/16-16.5 | EFFINGHAM (QW) |
| 17 | H | HOUSE & GARDEN | PERFECT | FOOT | 8 x 10 7/8 | 8 1/4 x 11 3/8 | 8 1/8 x 11 1/8 | 33-24 11/16-16.5 | EFFINGHAM (QW) |
| 18 | H | TRADITIONAL HOME | PERFECT | FOOT | 8 3/8 x 10 7/8 | 9 1/4 x 11 3/8 | 8 5/8 x 11 1/8 | 37-27 3/4-18.5 | LOMIRA (Q) |
| 19 | E | FAST COMPANY | PERFECT | FOOT | 8 3/4 x 10 1/2 | 9 1/4 x 11 3/8 | 9 x 11 1/8 | 37-27 3/4-18.5 | LOMIRA (Q) |
| 20 | H | INC. | PERFECT | FOOT | 8 3/4 x 10 7/8 | 9 1/4 x 11 3/8 | 9 x 11 1/8 | 37-27 3/4-18.5 | SUSSEX (Q) |
| 21 | H | GARDEN DESIGN | PERFECT | FOOT | 8 7/8 x 10 7/8 | 9 1/4 x 11 3/8 | 9 1/8 11 x 3/8 | 37-27 3/4-18.5 | SUSSEX (Q) |
| 22 | F | CHILD | PERFECT | FOOT | 9 x 10 7/8 | 9 1/4 x 11 3/8 | 9 1/4 11 x 3/8 | 37-27 3/4-18.5 | DYERSBURG (QW) |
| 23 | H | THIS OLD HOUSE | PERFECT | FOOT | 9 x 10 7/8 | 9 1/4 x 11 3/8 | 9 1/4 11 x 3/8 | 37-27 3/4-18.5 | EFFINGHAM (QW) |
| 24 | L | IN STYLE | PERFECT | FOOT | 9 x 10 7/8 | 9 1/4 x 11 3/8 | 9 1/4 11 x 3/8 | 37-27 3/4-18.5 | BARABOO (P) |
| 25 | E | BUSINESS WEEK | SADDLE | HEAD | 7 7/8 x 10 1/2 | 8 3/8 x 11 1/8 | 8 3/8 x 10 3/4 | | STBG/WAT/TORR/OSBK |
| 26 | N | NEWSWEEK | SADDLE | HEAD | 8 x 10 1/2 | 8 3/8 x 11 1/8 | 8 3/8 x 11 1/8 | | |
| 27 | N | SPORTS ILLUSTRATED | SADDLE | HEAD | 8 x 10 1/2 | 8 3/8 x 11 1/8 | 8 3/8 x 11 1/8 | | |
| 28 | N | TIME | SADDLE | HEAD | 8 x 10 1/2 | 8 3/8 x 11 1/8 | 8 3/8 x 11 1/8 | | |
| 29 | N | U.S. NEWS | SADDLE | HEAD | 7 3/4 x 10 1/2 | 8 3/8 x 11 1/8 | 8 3/8 x 11 1/8 | | |

FIG. 2

METHOD FOR IDENTIFYING ADVERTISING FORMS FOR INSERTION INTO PUBLICATIONS

BACKGROUND ART

The present invention relates to a method for providing indicia to accurately identify an advertising signature for insertion into publications. In particular, the present invention relates to providing identifiers for printed advertisement forms that include a magazine name and magazine issue date.

Local advertising expenditures in the United States approached about 93 billion dollars in 2002. Newspapers captured about 41% of the market for such expenditures, while television captured about 18%, radio accounted for about 15%, Yellow pages attracted about 12%, other media captured about 12%, and national magazines garnered only about 2%.

Magazines are assembled in a bindery, and the binding type of a magazine determines the particular method used to bind the pages together. A "perfect" bound magazine is one in which the pages are collated consecutively and then glued along their spine. A cover is then wrapped around the spine. A "saddle" bound magazine is one in which the pages are assembled by dropping them onto a chain line (explained below). The cover for a saddle-bound magazine is not wrapped but dropped around the pages and then stapled/stitched on the spine to hold the pages of the magazine together. Thus, saddle-bound magazines are assembled from the middle sections outward to the cover at the end of the process.

The printed pages of a magazine containing both content and advertisements are typically loaded into special bins at the bindery. A saddle production line includes a chain line, while a perfect-bound production line includes a belt-way, that travels beneath the bins. Each of the printed pages is dropped onto the chain line, or placed onto the belt-way, to accumulate the pages of a particular magazine. The pages of the magazine are aligned into a stack, trimmed to remove excess paper, and then bound.

A typical advertising signature is a sheet of paper that contains four full-page advertisements. The signature is folded in the middle, and a stack of such papers is placed into a particular bin so that the signature will be placed into the correct location within a magazine by the bindery. A signature is also known as a "form" or "insert".

There are various magazine page size attributes that are important for both printing and binding of magazines. The "jog" type of a magazine refers to how the printed pages are aligned by a bindery. The bindery machinery typically taps the accumulated pages at the "head" (near the top of the page), or the "foot" (near the bottom of the page) in a manner similar to that used by a person to align a stack of sheets of paper. The "magazine trim" dimensions pertain to the size of one page of a magazine, the "off-press signature size" pertains to the size of a printed sheet including borders, and the "delivered to bindery" size indicates the size of a sheet that includes margins or "lap areas" after the sheet has been printed and trimmed in preparation for delivery to a bindery.

Identification information, sometimes called "lap markers", "lap identifiers" or "spine markers" are printed on each signature in the lap area, and are used by the bindery to sort the signatures for insertion into particular magazines. For a saddle-bound publication, the lap area is trimmed away after the magazine is assembled. When the inserts are delivered to a bindery, the lap marker is checked to identify the insert so that the advertisement pages can be placed in the correct bin for assembly of the magazine. For a perfect-bound publication, the lap area is located along the edge of the page that will be glued to the spine. Thus, a spine marker is printed in the lap area that will be ground during assembly of the magazines.

Magazine Advertising Service Companies offer publishers and advertisers magazine advertising marketing services to facilitate the production and delivery of advertising pages to be inserted into magazines. Such companies take advertisement orders, instruct printers to ensure that the advertisements are printed correctly, and coordinate with bindery companies so that the inserts for the magazines are timely delivered. These companies offer advertisers the opportunity to place local or regional advertisements in national magazines.

In order to offer advertisers such services in a cost effective manner, a Magazine Advertising Service Company groups national magazines sharing similar editorial/audience attributes into "networks" so that print efficiency can be achieved. Magazines in a particular network typically share similar demographics, and/or share similar editorial content.

On a monthly basis, a Magazine Advertisement Service Company may coordinate printing of advertisement pages and supply 8 to 24 million printed inserts to binderies. (The volume may vary depending on magazine subscription level and the amount of advertising pages sold in any particular month.) Due to the large amount of advertising pages, and the sometimes severe time constraints placed on a bindery to assemble the monthly magazines, bindery companies rely on receiving signatures that satisfy their requirements and that have easily discernable lap identifiers. However, signatures received from certain Magazine Service Companies have proven to be substandard and/or difficult to identify.

Accordingly, there is a need in the field to provide signatures that meet bindery requirements and that contain accurate identification information. The present invention addresses these problems.

SUMMARY OF THE INVENTION

The present invention provides methods for identifying advertising forms for insertion into various publications. In an implementation, the technique includes providing advertising forms with a lap area, and printing a lap identifier onto the lap area. The lap identifier includes at least one of a publication name and an issue code so that the advertising forms can be properly correlated with the publication.

The invention may include one or more of the following features. The technique may include printing a publication advertising service company identifier onto the lap area. The lap identifiers may further include at least one of a printer company identifier, a printing press output, a folio code, a market, a publication category designator, and the configuration of the advertising pages. The issue code may be a publication date of at least one publication. The advertising forms may have a larger size than that of the publication pages. The technique may include inserting the forms into a saddle-bound publication and trimming the lap area from the forms after assembly of the publication. The method may also include inserting the form into a perfect-bound publication and grinding off the lap area when the magazine is bound and assembled. The publication may be a magazine.

In another implementation, an advertising form for a publication includes a sheet that contains advertising information and which has a lap area. A lap identifier is printed on the lap area that includes at least a publication name and an issue code so that the form can be matched with the publication. The lap area is not discernable after assembly of the publication.

The advertising form may include one or more of the following features. The publication may be a magazine, and the identification indicia may include a publication advertising service company identifier. The identification indicia may include at least one of a printer company identifier, a printing press output, a folio code, a market, a publication category designator, and the configuration of the advertising pages The issue code may be a publication date of at least one publication. The advertising forms may have a larger size than that of the publication pages. The lap area may be trimmed from the sheet after the form is inserted into a saddle-bound publication, and the lap area may be ground away after the form is inserted and bound into a perfect-bound publication.

The technique and advertising form advantageously permits a bindery to quickly and accurately correlate advertising forms with the issue month of publications, and to correlate the advertising forms with the magazines geography or market. In addition, in an implementation, the lap identifiers provide other useful information. For example, the printer company and press run identifiers may be used to contact a printer in case there is a problem with the forms, or to check on the quality of that run of forms.

The details of one or more embodiments of the invention are set forth in the accompanying drawings and the description below. Other features and advantages of the invention will be apparent from the detailed description and the drawings, and from the claims.

BRIEF DESCRIPTION OF THE DRAWING FIGURES

In the figures,

FIG. 2 is a table illustrating how magazines could be grouped into clusters based on magazine attributes;

Figure 4:
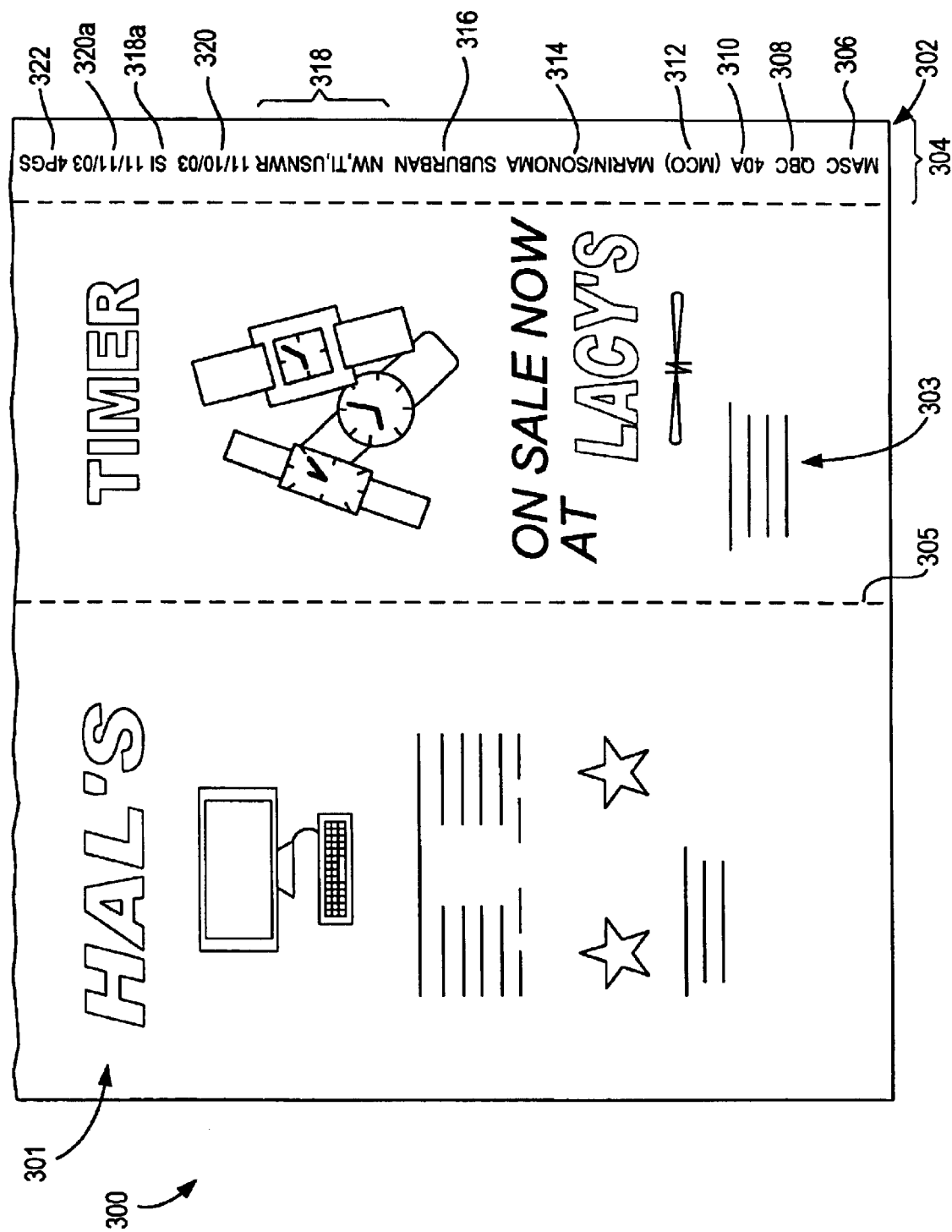
Figure 5:
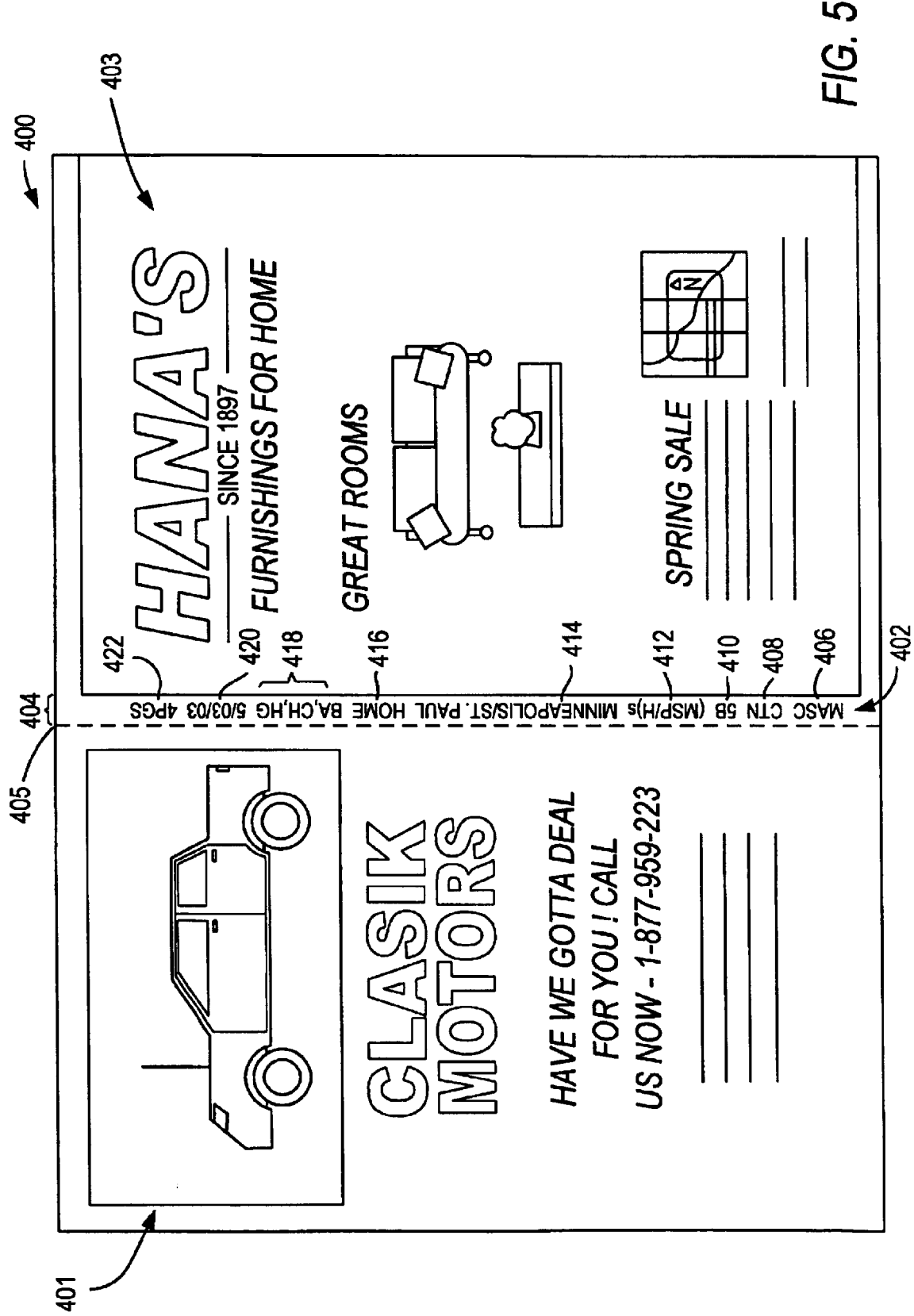

FIG. 4 is a simplified example of an advertising form, not drawn to scale, containing indicia according to the invention to accurately identify the advertising material to a bindery for insertion into saddle-bound magazines; and FIG. 5 is a simplified example of an advertising form, not drawn to scale, containing indicia according to the invention to accurately identify the advertising material to a bindery for insertion into perfect-bound magazines.

DETAILED DESCRIPTION OF THE PREFERRED EMBODIMENTS

Figure 1:
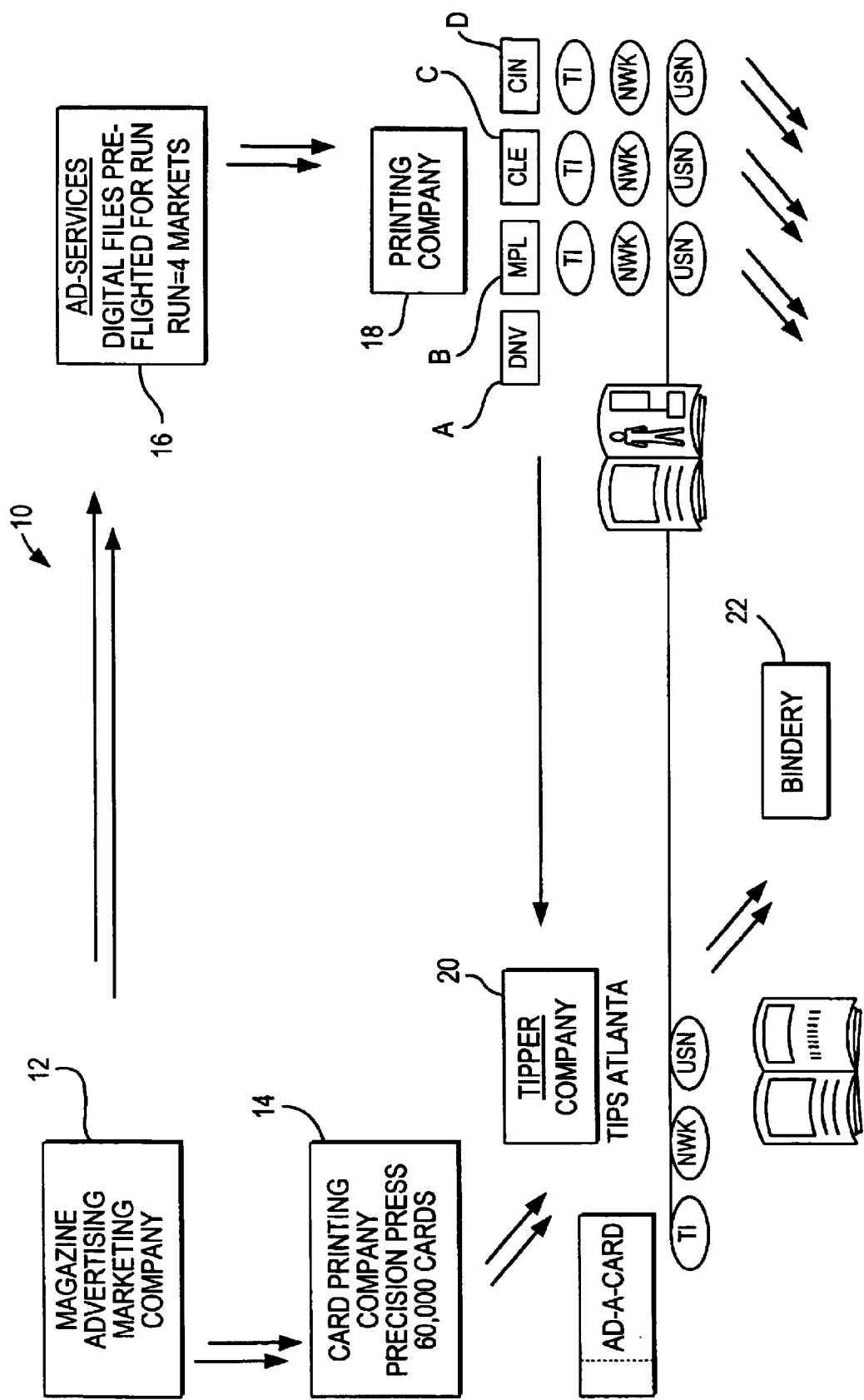
FIG. 1 is a block diagram of the manufacturing flow of an advertisement.

FIG. 1 is a simplified block diagram of the manufacturing flow 10 of an advertisement for insertion into a magazine. A Magazine Advertising Marketing Company 12 receives an order for four pages to appear in a collection (network) of magazines for the Atlanta market. In this example, each form has four full-page advertisements, and one form includes an advertisement with an "Ad-a-card" or direct response card. The direct response card is attached to a particular advertisement on a page for consumer use. Some examples of direct response cards are post-it® type notes, standard three and one half inch by five inch cards, a three and three-eights inch coated tag, and a paper rolodex card.

The response cards are attached by companies called "tippers" after the advertisement pages have been printed, using a separate process. The Company 12 places an order with a Direct response printing company 14 to manufacture 60,000 cards. The Company 12 also includes an Ad Services Department 16 that pre-flights (or checks) each digital advertising page file. These advertising files define the characteristics and print requirements for each page of advertisement. The Company 12 then places an order with a printing company 18 to commence a print run of the forms. Printing company 18 prints the forms, including the form to be tipped, on their printing press machine. Printing company 18 then sends the form requiring the "Ad-a-card" to a Tipper Company 20 that services the Atlanta market, and Card printing company 14 sends the 60,000 cards to the same Tipper Company. The Tipper Company then attaches the card to the printed advertisement page of the form in the desired orientation. The form with the tipped advertising page, and the other forms are sent to a Bindery Company 22 for insertion of the regional advertisements into the national magazines.

Printing companies that print advertising for magazines use high-speed web offset printing press machines capable of high-quality, four-color production of printed forms. The printing press machines utilize plates to make color or black-and-white impressions on paper rolls fed through the press at high speeds. Each high-speed printing press can utilize up to two webs and sixteen plates. Eight plates are setup on one web and eight are setup on the other web. Each plate is typically capable of printing sixteen-full page advertisements on each side of the paper roll. There are typically four outputs for the high-speed press. Further details of high-speed printing presses are beyond the scope of the present invention and will not be discussed further herein.

Referring again to FIG. 1, each printing press typically has four outputs designated A, B, C and D, and in this example, output A contains the advertising pages to be tipped by the Tipper Company. In the example shown in FIG. 1, one web was used to produce all of the output inserts. Consequently, only one-half of the high-speed press was utilized to produce all of the outputs.

In order to further improve printing press utilization, form runs for two magazines having similar or identical physical properties can be printed on the same printing press. FIG. 2 is a table 100 that clusters magazines according to their various printing attributes across various networks. In particular, a first cluster 102 includes seventeen magazines, including different magazines which are magazines that belong to different network categories. A second cluster 104 also includes magazine titles that belong to different networks, and a third cluster 106 contains mostly "News" network magazines but also includes one "Executive" network magazine. Thus, there are many options available for ganging advertising forms for magazines in the cluster 102.

Column 101 in FIG. 2 denotes the names of magazines, and the other column headings denote various physical characteristics of the pages of each magazine listed. In particular, the column headings indicate bind type 108, jog 110, magazine trim 112, off-press signature size 114, the size delivered to the bindery 116, the roll size 125, and the bindery name 126 used for that magazine. For example, in cluster 102, all of the magazines use a perfect bind, are jogged to the foot, have similar magazine trim requirements, similar off-press signature sizes, and have similar sizes delivered to a bindery. Thus, advertisement printing jobs for these magazines can be married or ganged together to optimize printing press usage.

As explained above, on a monthly basis, a Magazine Advertisement Service Company may coordinate printing of advertisement pages and cause to have 8 to 24 million printed inserts delivered to binderies. Due to the large amount of advertising pages, and the sometimes severe time constraints placed on a bindery to assemble monthly magazines, bindery companies expect to receive signature pages that satisfy their requirements and that can be easily identified. However, signature pages received from certain Magazine Service Companies have proven to be substandard, in that they do not meet the "delivered-to-bindery" page sizes required to easily fit into the bins used during assembly of magazines, or deliver inserts on a lightweight paper stock. Misfit inserts, and inserts printed on paper stock that is too lightweight can cause problems during assembly, such as causing misaligned or torn pages, that require magazines to be discarded. Insert problems that cause magazines to be discarded are both wasteful in resources and time, and increase binding and/or publication costs. Inserts delivered to a bindery that cannot be easily identified often result in delays, which also can increase the cost to assemble magazines.

Figure 3:
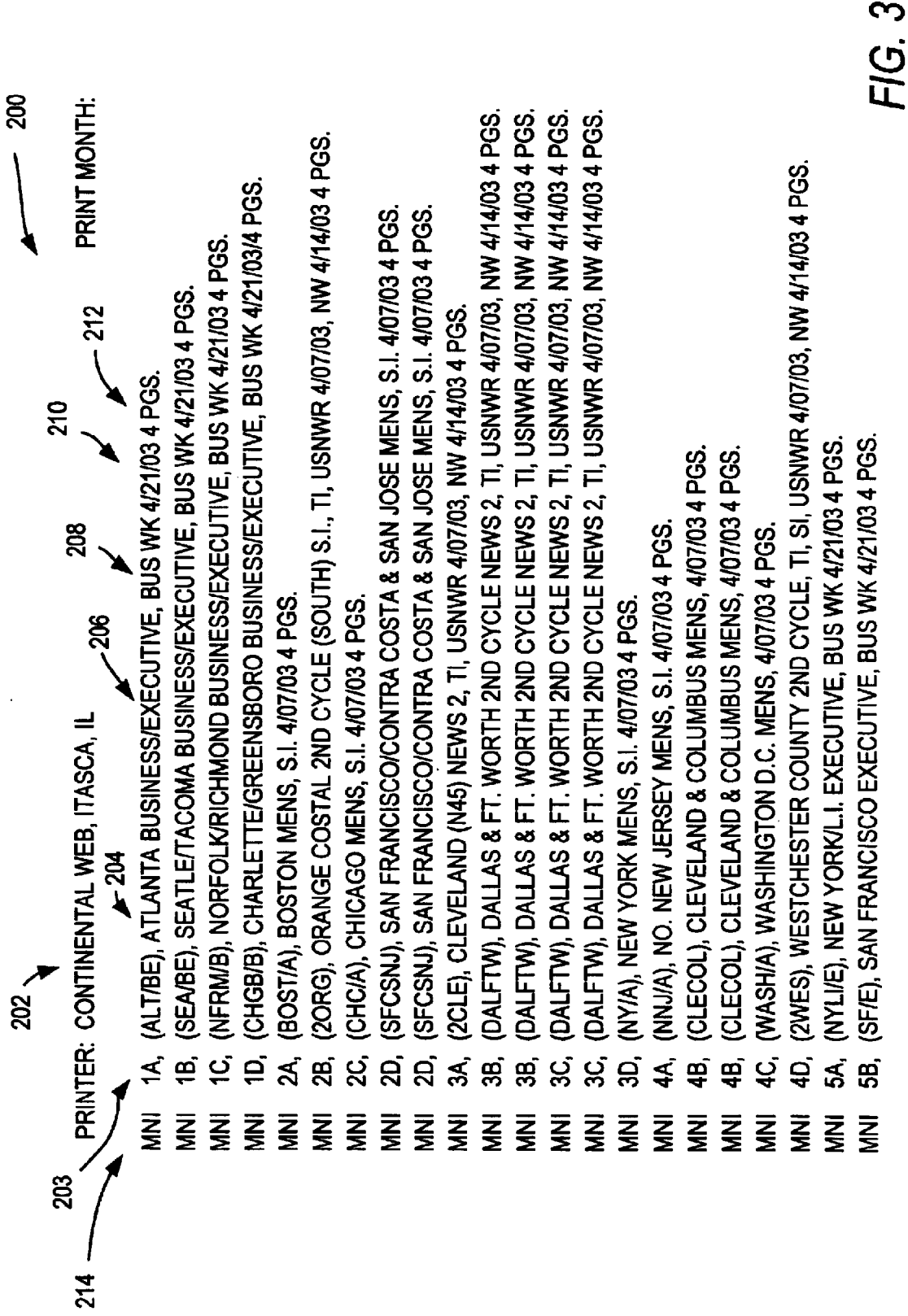
FIG. 3 is an example of a bindery information sheet.

FIG. 3 is an example of a bindery information sheet 200 that may be supplied to a bindery on a monthly basis by a Magazine Advertising Service Company. The information sheet 200 contains information that may also be printed on the lap area of the forms delivered to the bindery to uniquely identify the forms. In particular, each row provides data that can be printed as part of the lap identifier found on each form. Such data may include the identity of the printer 202, the press outputs 203 used for particular runs, the market 204, the magazine network 206, the name of the magazine 208, the publication date 210 of the magazine, and the number of pages 212. A Magazine Advertising Service Company identifier 214 may also be provided.

It makes good business sense for a Magazine Advertising Service Company to make sure that a printer carefully adheres to the "delivered-to-bindery" page size and other requirements specified by the bindery. A Magazine Advertising Service Company that ensures delivery of forms that meet or exceed bindery requirements will acquire a good reputation amongst the bindery companies. Thus, a Magazine Advertising Service Company identifier 214 is printed as part of the lap identifier, and may be used by the bindery companies as an indication of receipt of quality forms. Conversely, absence of a company identifier on inserts delivered to a bindery company may cause that bindery to perform additional screening procedures to make sure that the inserts in question meet their requirements.

FIG. 4 is a simplified example of an advertising form 300, not drawn to scale, containing a lap identifier 302 printed in a lap area 304 and two full-page advertisements 301 and 303 for a saddle-bound type magazine. Two additional full-page advertisements (not shown) are printed on the opposite side of the form, and a fold line is shown between the advertisements 301 and 303 as dotted line 305. The overall dimensions of the form 300 are specified by a bindery, and each advertising page exceeds the magazine page size by a predetermined amount. The lap area 304 including the lap identifier 302 and any excess paper on the edges of the form will be trimmed away during the final stages of magazine binding.

The lap identifier 302 contains indicia for uniquely and accurately identifying the form to a bindery so that the form can be placed into the correct bin for insertion into saddle-bound magazines. In particular, the indicia may include the initials 306 of a Magazine Advertising Services Company (here shown as "MASC"). It should be understood, however that other types of company indicia instead of initials could be used, such as alpha-numeric codes, or a logo, or other mark (which may be a service mark or trademark). Other identifying indicia may include a printer company 308 and a print run number 310, a folio code 312, the regional market 314, a category (or cluster or network) designator 316, the name 318 (or initials) of one or more magazines, the publication date 320 associated with the magazine or magazines, and the configuration 322 or the number of advertising pages in the form. The printer company and run number data permits a bindery or Publication Advertising Services Company to identify a particular printing press run in case there is a problem with a particular run of forms, or if it is desirable to check on the quality of a run of printed forms. The publication date is useful because a bindery may assemble a particular magazine title on a monthly basis, since some magazines publish more or less than twelve times a year. In FIG. 4, the publication date is printed to indicate the month, day and year of publication, but it should be understood that the publication date may be an issue code, wherein alpha-numeric indicia or some other type of coded indicia identifiable by a bindery may be used. The folio code 312 specifies the region 314 in which the advertisements are meant to be run, and in FIG. 4 the region is Marin and Sonoma counties of California. Moreover, in the example shown in FIG. 4, the indicia printed in the lap area indicates at 318 and 318a that the four page form 322 is to be inserted into four different magazines: NW (*Newsweek*), TI (*Time*), USNWR (*U.S. News & World Report*) and SI (*Sports Illustrated*). In particular, the first three magazine names 318 have a publication date 320 of Nov. 10, 2003, whereas the fourth magazine 318a has a publication date 320a of Nov. 11, 2003. Thus, more than one magazine and more than one publication date can be specified as part of the lap identifier 302. All of this data is useful information that enables a bindery to quickly and accurately correlate the form to the correct issue month of the specified saddle-bound magazines for assembly. In addition, when the form 300 is to be inserted during assembly of the magazine, the bindery machinery pinches or grasps the lap area 304 and pulls the form onto the chain line.

FIG. 5 is a simplified example of an advertising form 400, not drawn to scale, containing a lap identifier or spine marker 402 printed in a lap area 404 and two full-page advertisements 401 and 403 for a perfect-bound type magazine. Two additional full-page advertisements (not shown) are printed on the opposite side of the form, and a fold line is shown between the advertisements 401 and 403 as dotted line 405. The overall dimensions of the form 400 are specified by a bindery, and each advertising page exceeds the magazine page size by a predetermined amount. Thus, the lap identifier 402 found in the lap area is used by the bindery to accurately place the forms into the correct bins for insertion into perfect-bound magazines.

Referring again to FIG. 5, the spine marker 402 will be ground off during the process of binding the pages of advertising into the magazine. In addition, any excess paper on the edges of the form will be trimmed away. The spine marker 402 contains indicia for accurately and uniquely identifying the form to a bindery for insertion into perfect-bound magazines. In particular, the indicia may include the initials 406 of a Magazine Advertising Services Company (here shown as "MASC"). It should be understood, however that other types of identifiers instead of initials could be used, such as alpha-numeric codes, or a logo, or other mark (which may be a service mark or trademark). Other identifying indicia may include a printer company 408, a print run number 410, a folio code 412, the regional market 414, a category (or cluster or network) designator 416, the name 418 (or initials) of one or more magazines, the publication date 420 associated with the magazine or magazines, and the configuration 422 or the number of advertising pages in the form. As explained above, it should be understood that the publication date may be an issue code, wherein alpha-numeric indicia or other indicia identifiable by a bindery is used to indicate magazine publication dates.

The folio code 412 indicates the region and network in which the advertisements are meant to be run. In the example shown in FIG. 5, the region 414 is Minneapolis and Saint Paul in Minn., and the network 416 is Home. Moreover, in the example shown in FIG. 5, the magazine initials 418 printed in the lap area indicate that the four page form 422 is to be inserted into three different magazines: BA (*Bon Appetit*), CH (*Country Home*), and HG (*House & Garden*). All three of these magazines have a publication date 420 of May 3, 2003. Thus, more than one magazine can be specified, and it is also possible that the magazines could have more than one publication date can as part of the lap identifier 402. All of this data is useful information that enables a bindery to quickly and accurately correlate the form to the correct issue month of the specified perfect-bound magazines for assembly.

A method for providing indicia to identify advertising forms for insertion into magazines has been described. In particular, indicia such as the magazine name and publication date is printed onto a lap area of the form. The bindery uses the information to more effectively sort and place forms into the correct issue month for insertion into magazines. The printed information may also include indicia such as a Magazine Advertising Marketing Company identifier, the market, the name of the printer company, the printing press run and output, and a magazine network designation.

A number of implementations of the invention have been described. Nevertheless, it will be understood that various modifications may be made without departing from the spirit and scope of the invention. Accordingly, other embodiments are within the scope of the following claims.

What is claimed is:

1. A method of identifying advertising forms for insertion into publications which comprises providing the advertising forms with a lap area, printing a lap identifier including at least one of a publication name and an issue code onto the lap area so that the advertising forms can be properly correlated with the publication inserting the advertising forms into the publications, and removing the lap area from the forms after the forms are inserted into the publications.

2. The method of claim 1 wherein the issue code is a publication date of at least one publication.

3. The method of claim 1 wherein the advertising forms have a larger size than that of the publication pages.

4. The method of claim 1 wherein the forms are inserted into a saddle-bound publication and the lap area is trimmed from the forms after assembly of the publication.

5. The method of claim 1 wherein the form is inserted into a perfect-bound publication and the lap area is ground away when the magazine is bound and assembled.

6. The method of claim 1 wherein the publication is a magazine.

7. A method of identifying advertising forms for insertion into publications which comprises providing the advertising forms with a lap area, printing a lap identifier including at least one of a publication name and an issue code onto the lap area so that the advertising forms can be properly correlated with the publication, and printing a publication advertising service company identifier onto the lap area.

8. A method of identifying advertising forms for insertion into publications which comprises providing the advertising forms with a lap area, and printing a lap identifier including at least one of a publication name and an issue code onto the lap area so that the advertising forms can be properly correlated with the publication, wherein the lap identifier further comprises at least one of a printer company identifier, a printing press output, a folio code, a market, a publication category designator, and the configuration of the advertising pages.

9. An advertising form for a publication comprising a sheet that contains advertising information therein and which has a lap area, and a lap identifier printed on the lap area that includes at least a publication name and an issue code so that the form can be matched with the publication, wherein the lap area is not discernable after assembly of the publication.

10. The advertising form of claim 9 wherein the publication is a magazine.

11. The advertising form of claim 9 wherein the identification indicia includes a publication advertising service company identifier.

12. The advertising form of claim 9 wherein the identification indicia includes at least one of a printer company identifier, a printing press output, a folio code, a market, a publication category designator, and the configuration of the advertising pages.

13. The advertising form of claim 9 wherein the issue code is a publication date of at least one publication.

14. The advertising form of claim 9 having a larger size than that of the publication pages.

15. The advertising form of claim 9 wherein the lap area is trimmed from the sheet after the form is inserted into a saddle-bound publication.

16. The advertising form of claim 9 wherein the lap area is ground away after the form is inserted and bound into a perfect-bound publication.

* * * * *